United States Patent
Grabon

(10) Patent No.: US 9,765,987 B2
(45) Date of Patent: Sep. 19, 2017

(54) SYSTEM FOR CONDENSATE ENERGY UTILIZATION

(75) Inventor: Michel Grabon, Bressolles (FR)

(73) Assignee: CARRIER CORPORATION, Farmington, CT (US)

( * ) Notice: Subject to any disclaimer, the term of this patent is extended or adjusted under 35 U.S.C. 154(b) by 696 days.

(21) Appl. No.: 14/116,437

(22) PCT Filed: May 11, 2011

(86) PCT No.: PCT/IB2011/001562
§ 371 (c)(1),
(2), (4) Date: Nov. 8, 2013

(87) PCT Pub. No.: WO2012/153163
PCT Pub. Date: Nov. 15, 2012

(65) Prior Publication Data
US 2014/0069134 A1    Mar. 13, 2014

(51) Int. Cl.
*F25B 47/00* (2006.01)
*F24F 12/00* (2006.01)
(Continued)

(52) U.S. Cl.
CPC ........... *F24F 12/00* (2013.01); *F24F 3/1405* (2013.01); *F24F 3/153* (2013.01); *F24F 11/02* (2013.01); *F24F 11/06* (2013.01); *F24F 12/006* (2013.01); *F24F 13/222* (2013.01); *F28D 5/00* (2013.01); *Y02B 30/563* (2013.01)

(58) Field of Classification Search
CPC .............. Y02B 30/545; F24F 2013/225; F24F 12/006; F24F 2001/0092; F28D 5/00
See application file for complete search history.

(56) References Cited

U.S. PATENT DOCUMENTS

| | | | |
|---|---|---|---|
| 4,067,205 A | 1/1978 | Mayhue | |
| 4,406,138 A * | 9/1983 | Nelson | F24F 5/001 62/119 |

(Continued)

FOREIGN PATENT DOCUMENTS

| | | |
|---|---|---|
| EP | 1748260 A1 | 1/2007 |
| EP | 1821042 | 8/2007 |

(Continued)

OTHER PUBLICATIONS

Notification of Transmittal of the International Search Report and the Written Opinion of the International Searching Authority, or the Declaration; PCT/IB2011/001562; dated Dec. 9, 2011.

(Continued)

*Primary Examiner* — Allen Flanigan
*Assistant Examiner* — Filip Zec
(74) *Attorney, Agent, or Firm* — Cantor Colburn LLP

(57) ABSTRACT

An air conditioning system includes an inlet duct, supply duct, return duct and exhaust duct: a heat exchanger for providing heat transfer between air from the inlet duct and air from the return duct: a cooling coil position in the supply duct: a pan for collecting condensate from the cooling coil; a pump to pump condensate from the pan: and a sprayer coupled to the pump, the sprayer spraying condensate into an air path to increase efficiency of the air conditioning system.

7 Claims, 4 Drawing Sheets

(51) Int. Cl.
*F24F 3/14* (2006.01)
*F24F 3/153* (2006.01)
*F24F 11/02* (2006.01)
*F24F 11/06* (2006.01)
*F24F 13/22* (2006.01)
*F28D 5/00* (2006.01)

(56) References Cited

U.S. PATENT DOCUMENTS

| | | | |
|---|---|---|---|
| 5,056,588 A | 10/1991 | Carr | |
| 5,682,757 A | 11/1997 | Peterson | |
| 6,199,389 B1 | 3/2001 | Maeda | |
| 6,385,985 B1 | 5/2002 | Bussjager et al. | |
| 6,481,232 B2 | 11/2002 | Faqih | |
| 6,823,684 B2 * | 11/2004 | Jensen | F24F 5/0035 62/171 |
| 7,093,452 B2 * | 8/2006 | Chee | F24F 1/022 62/175 |
| 7,150,160 B2 | 12/2006 | Herbert | |
| 7,231,967 B2 * | 6/2007 | Haglid | B25B 27/0035 165/231 |
| 7,370,490 B2 | 5/2008 | Li | |
| 7,886,557 B2 | 2/2011 | Anderson et al. | |
| 2004/0244398 A1 * | 12/2004 | Radermacher | E03B 3/28 62/285 |
| 2008/0022709 A1 * | 1/2008 | McKee | F24F 5/0035 62/314 |
| 2008/0156465 A1 | 7/2008 | Weidmann | |
| 2010/0005831 A1 | 1/2010 | Vaisman et al. | |

FOREIGN PATENT DOCUMENTS

| | | |
|---|---|---|
| GB | 2215833 A | 9/1989 |
| WO | 2012153163 | 11/2012 |

OTHER PUBLICATIONS

Notification of Transmittal of the International Preliminary Report on Patentability of the International Searching Authority, or the Declaration; PCT/IB2011/001562; dated Nov. 21, 2013.

* cited by examiner

SYSTEM FOR CONDENSATE ENERGY UTILIZATION

BACKGROUND OF THE INVENTION

Embodiments relate to generally heating, ventilation and air conditioning (HVAC) systems, and more particularly to a method and system of using condensate energy to improve HVAC system efficiency.

Air handling systems are used to heat or cool spaces. To provide appropriate air quality in occupied space, a significant amount of fresh air is brought to a building (e.g., 25 m3 h occ). This fresh air represents significant part of the thermal load of the building. This is particularly true if the air outside the building has high enthalpy content (hot and humid). The same amount of the air is extracted from the building. Extracted air has moderate dry bulb temperature and humidity (relatively low enthalpy content). Fresh air is thermally treated (cooled) and often re-heated before being supplied to an occupied space. This treatment allows for supplying air with a specified temperature and humidity level. Air treatment is conventionally provided by air handling units that include air movers (e.g., fans) and heat exchangers (water to air heat exchangers) to cool or heat the air. Usually the media to cool or heat the air is cold or hot water, with the cold water being cooled by chillers.

During the process of cooling the air, a significant amount of moisture can be removed to reduce the absolute humidity of the air. This humidity condensate on a cooling cod is collected in a condensate pan and rejected outside of the building. The amount of water removed from the air depends on fresh air relative humidity and dry bulb temperature. Given the fact that fresh air brought into the building is hot and the extracted air is colder, there is potential of exchanging energy between the two streams of the air (fresh air and extracted air). This energy exchange may be realized by air/air heat exchanger (e.g., a plate type heat exchanger). Application of such a heat exchanger will decrease temperature of fresh air and increase temperature of rejected air. By application of such a solution, overall energy of air conditioning system may be significantly reduced (10%).

There are other methods to exchange energy between the two streams of the air (extracted and fresh air). Those methods apply an enthalpy wheel to perform the heat exchange. An enthalpy wheel allows not only reduced temperature of fresh air but also a reduction of absolute humidity. Application of an enthalpy wheel is often more time expensive than a plate heat exchanger, but is also more efficient from an energy saving point of view.

While the existing air heat exchangers in air handling units work well for their intended purposes, improvements to system efficiency would be well received in the art.

BRIEF DESCRIPTION OF THE INVENTION

According to one aspect of the invention, an air conditioning system includes an inlet duct, supply duct, return duct and exhaust duct; a heat exchanger for providing heat transfer between air from the inlet duct and air from the return duct; a cooling coil position in the supply duct; a pan for collecting condensate from the cooling coil; a pump to pump condensate from the pan; and a sprayer coupled to the pump, the sprayer spraying condensate into an air path to increase efficiency of the air conditioning system.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
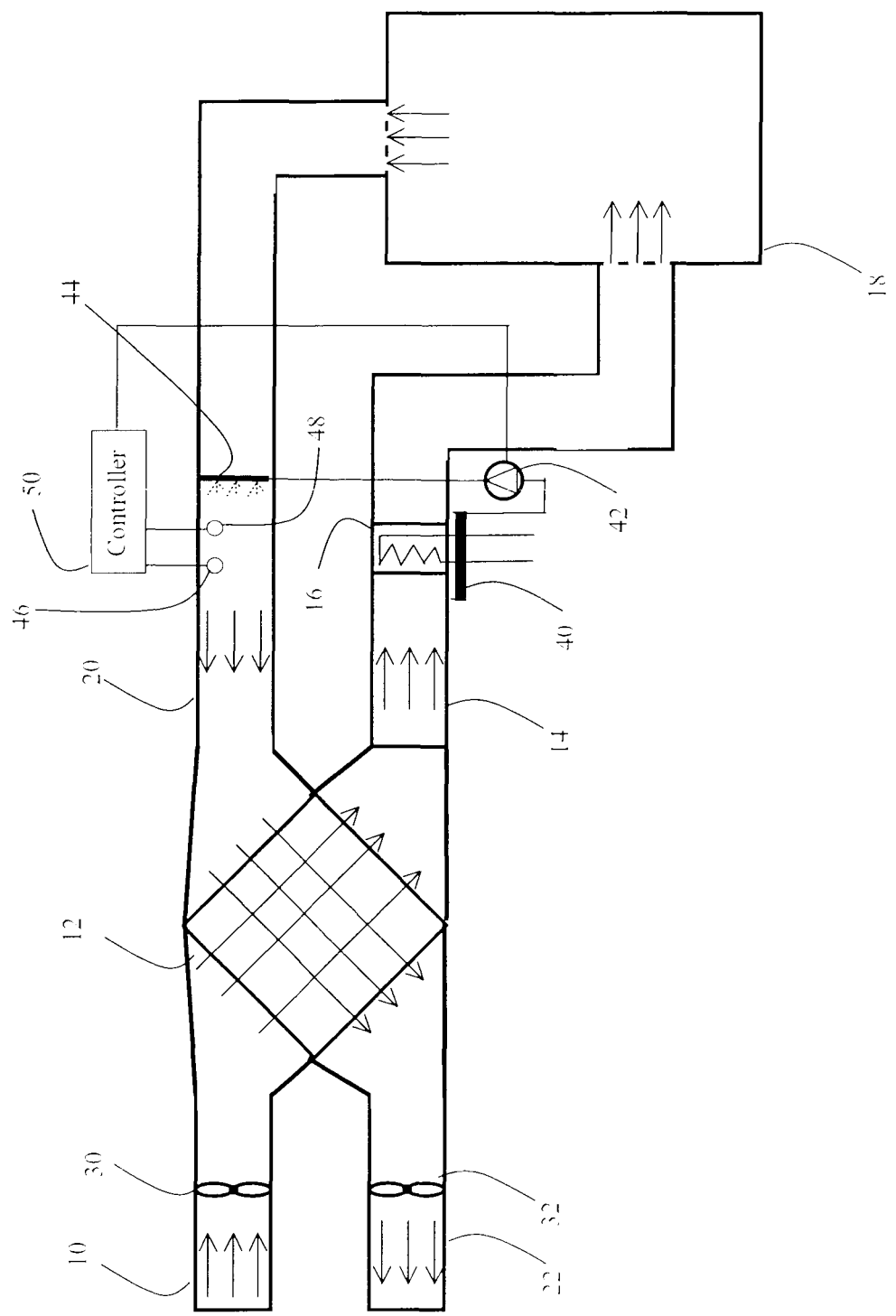
FIG. 1 shows an air conditioning system using condensate energy recovery.

FIG. 1 shows an air conditioning system using condensate energy recovery. In FIG. 1, an inlet duct 10 draws in inlet air (e.g., hot and humid air) via a fan 30. The inlet air passes through heat exchanger 12, which may be a plate type heat exchanger or other known configuration (e.g., wheel). The inlet air flows to supply duct 14 and passes over cooling coils 16. Cooling coils 16 may be part of a conventional air conditioning system. From supply duct 14, the air flows into a space 18 to be cooled. A fan 32 draws return air from space 18 through return duct 20, through heat exchanger 12 and out exhaust duct 22. In this way, heat exchanger 12 provides heat transfer between the inlet air and the return air.

When the supply air passes over the cooling coil 16, condensate is collected in a condensate pan 40. The condensate is pure water and without minerals. As noted above, existing designs discard the condensate. Embodiments of the invention use the condensate to improve system efficiency. In FIG. 1, pump 42 is used to pump condensate from pan 40 to a condensate sprayer 44 located in an air path (e.g., return duct 20), upstream of heat exchanger 12. Condensate sprayer 44 includes a manifold and a plurality of nozzles for spraying the condensate from pan 40 into the air flowing through return duct 20.

Controller 50 controls pump 42 in response to a wet bulb temperature sensor 46 and a dry bulb temperature sensor 48. If the wet bulb temperature is lower that the dry bulb temperature, then controller 50 signals pump 42 to pump condensate from pan 40 to sprayer 44. Once the wet bulb temperature is equal to the dry bulb temperature, the air in return duct 20 is saturated and controller 50 turns pump 42 off. In an alternate embodiment, controller 50 operates pump 42 whenever a difference between the dry bulb temperature and the wet bulb temperature is more than a threshold.

Sprayer 44 saturates the air in return duct 20 prior to heat exchanger 12. Injecting the condensate water to the air stream increases humidity and decreases temperature. The air in return duct 20 can achieve saturation, resulting in temperature drop of several ° C. As sprayer 44 is upstream of heat exchanger 12, the temperature gradient in heat exchanger 12 will increase and will provide more cooling to the fresh air stream in duct 10. This increases efficiency of heat exchanger 12, resulting in an approximately 15% energy savings compared to existing systems.

Figure 2:
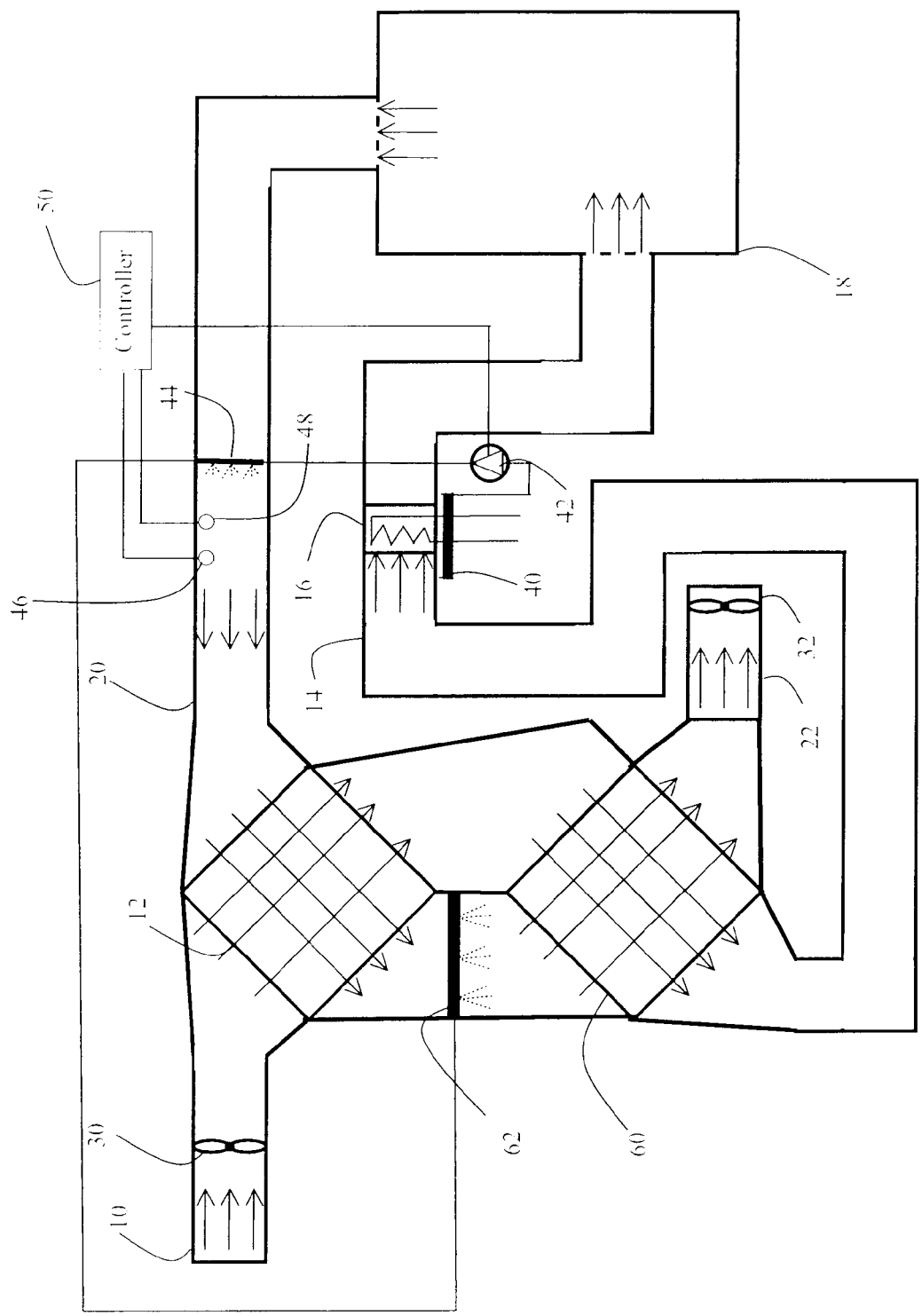
FIG. 2 shows an air conditioning system using two stages of condensate energy recovery.

FIG. 2 shows an air conditioning system using two stages of condensate energy recovery. Several components of FIG. 2 are similar to those of FIG. 1, and the same reference number is used for such elements. FIG. 2 illustrates a second heat exchanger 60 downstream of heat exchanger 12. Second heat exchanger 60 provides heat transfer between inlet air from first heat exchanger 12 and return air from first heat exchanger 12. Sprayer 62 is positioned in an air path (e.g., return duct 20) to further cool the return air after exiting first heat exchanger 12 and before second heat exchanger 60. As described above, controller 50 controls pump 42 to pump the condensate from pan 20 to sprayers 44 and 62. Sprayer 62 may be separately controlled by including a wet bulb temperature sensor and a dry bulb temperature sensor downstream of sprayer 62, and using a separate pump for sprayer 62. The configuration in FIG. 2 uses a single pump 42 for both sprayer 44 and sprayer 62. Using two sprayers 44 and 62 further increases efficiency of system, resulting in an approximately 22% energy sayings compared to existing systems.

Figure 3:
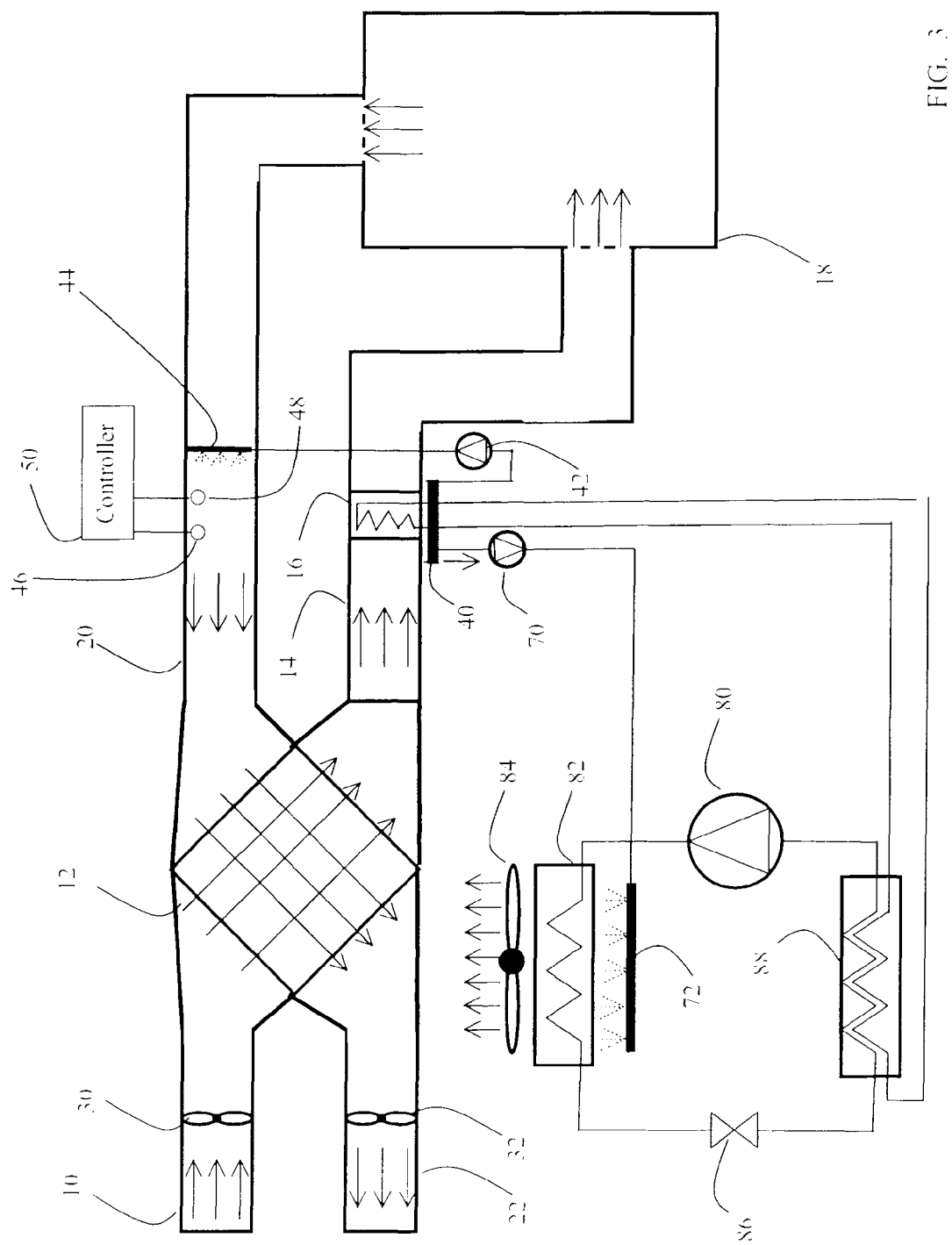
FIG. 3 shows an air conditioning system using condensate energy recovery with a condenser.

FIG. 3 shows an air conditioning system using one stage of condensate energy recovery along with using condensate for condenser an precooling. Several components of FIG. 3 are similar to those of FIG. 1, and the same reference number is used for such elements. As described above, sprayer 44 sprays condensate from pan 40 to cool and saturate air in return duct 20. FIG. 3 includes a second pump 70 that pumps condensate from pan 40 to condenser sprayer 72. Sprayer 72 is directed at an air path (e.g., condenser 82) of a chiller system. The chiller system includes a compressor 80, condenser 82, expansion valve 86 and evaporator 88. Cooling coils 16 in supply duct 14 are coupled to evaporator 88.

In operation, condensate from pan 40 is pumped to sprayer 72 to further cool the air path drawn over the condenser coils by fan 84. If the air drawn over the condenser coils is cooled, this results in more efficient chiller operation. Use of sprayer 44 and sprayer 72 results in an approximately 15%-20% energy savings compared to existing systems.

Figure 4:
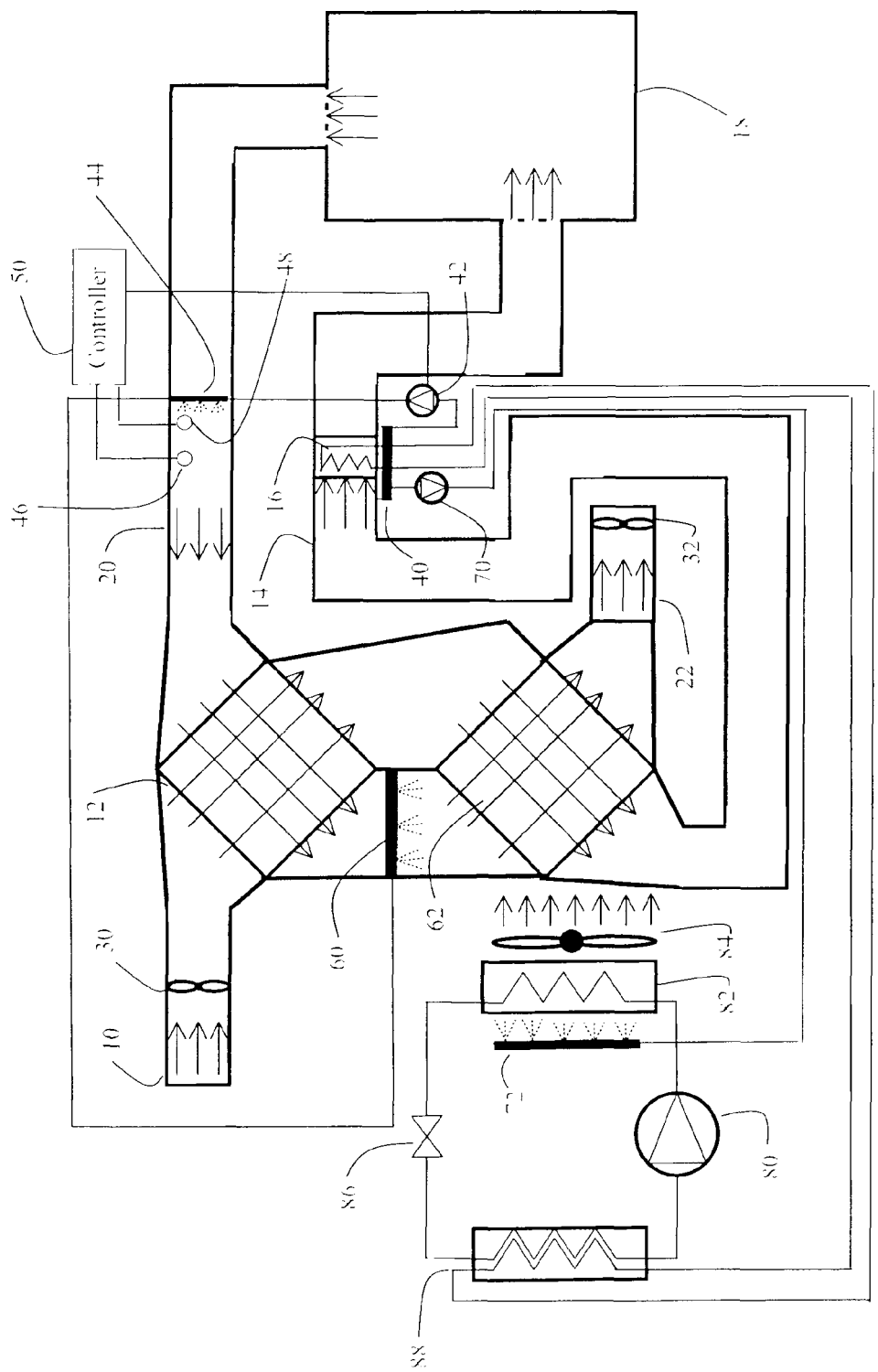
FIG. 4 shows an air conditioning system using two stages of condensate energy recovery and condensate energy recovery with a condenser.

FIG. 4 shows an air conditioning system using two stages of condensate energy recovery along with using condensate for condenser air precooling. Several components of FIG. 4 are similar to those of FIGS. 2 and 3, and the same reference number is used for such elements. As shown in FIG. 4, pump 42 provides condensate from pan 40 to sprayer 44 to saturate and reduce the temperature of the air path in the return duct 20 prior to heat exchanger 12. A second sprayer 60 also receives condensate from pan 40 to saturate and reduce the temperature of the air path prior to heat exchanger 62 and exhaust duct 22. As noted above with respect to FIG. 2, sprayers 44 and 60 improve the efficiency of heat exchangers 12 and 62 by cooling and saturating the return air. As noted above, sprayers 44 and 60 may be controlled in unison by controller 50, or independently if desired.

FIG. 4 also includes a second pump 70 that pumps condensate from pan 40 to sprayer 72. Sprayer 72 is directed at an air path over condenser 82 of a chiller system. As known in the art, chiller systems include a compressor 80, condenser 82, expansion valve 86 and evaporator 88. Cooling coils 16 in supply duct 14 are coupled to evaporator 88.

In operation, condensate from pan 40 is pumped to sprayer 72 by pump 70 to further cool the air drawn over the condenser coils by fan 84. If the air drawn over the condenser coils is cooled, this results in more efficient chiller operation. Use of sprayers 44, 60 and sprayer 72 results in an approximately 28% energy savings compared to existing systems.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An air conditioning system comprising:
   an inlet duct, supply duct, return duct and exhaust duct;
   a heat exchanger for providing heat transfer between air from the inlet duct and air from the return duct;
   a cooling coil position in the supply duct;
   a pan for collecting condensate from the cooling coil;
   a pump to pump condensate from the pan;
   a sprayer coupled to the pump, the sprayer spraying condensate into an air path to increase efficiency of the air conditioning system;
   a second heat exchanger downstream of the first heat exchanger, the second heat exchanger for providing heat transfer between air from the inlet duct and air from the return duct; and
   a second sprayer spraying condensate into an air path to increase efficiency of the air conditioning system.

2. The air conditioning system of claim 1 wherein:
   the second sprayer is positioned in the return duct between the heat exchanger and the second heat exchanger; and
   the sprayer is positioned in the return duct upstream of the heat exchanger.

3. The air conditioning system of claim 1 further comprising:
   a chiller system having an evaporator coupled to the cooling coils and a condenser; and
   a condenser sprayer spraying the condensate in an air path over coils of the condenser.

4. The air conditioning system of claim 3 further comprising:
   a second pump for pumping condensate from the condensate pan to the condenser sprayer.

5. The air conditioning system of claim 1 further comprising:
   a wet bulb temperature sensor producing a wet bulb temperature;
   a dry bulb temperature sensor producing a dry bulb temperature; and
   a controller for monitoring the wet bulb temperature and the dry bulb temperature, the controller configured to activate the pump in response to the wet bulb temperature and dry bulb temperature.

6. The air conditioning system of claim 5 wherein:
   the wet bulb temperature sensor and the dry bulb temperature sensor are positioned to measure the wet bulb temperature and the dry bulb temperature in return air from the return duct.

7. The air conditioning system of claim 1 wherein:
   the heat exchanger is a plate type heat exchanger.

* * * * *